United States Patent
Jonker et al.

(10) Patent No.: US 9,521,031 B2
(45) Date of Patent: Dec. 13, 2016

(54) INTERNET ACCESS CONTROL USING DEPTH PARAMETERS

(71) Applicant: Boingo Wireless, Inc., Los Angeles, CA (US)

(72) Inventors: Niels Jonker, Reston, VA (US); James William Lake, Santa Monica, CA (US)

(73) Assignee: Boingo Wireless, Inc., Los Angeles, CA (US)

( * ) Notice: Subject to any disclaimer, the term of this patent is extended or adjusted under 35 U.S.C. 154(b) by 110 days.

(21) Appl. No.: 13/777,162

(22) Filed: Feb. 26, 2013

(65) Prior Publication Data

US 2013/0226863 A1 Aug. 29, 2013

Related U.S. Application Data

(60) Provisional application No. 61/603,851, filed on Feb. 27, 2012.

(51) Int. Cl.
*G06F 17/30* (2006.01)
*H04L 12/24* (2006.01)
(Continued)

(52) U.S. Cl.
CPC ........... *H04L 41/00* (2013.01); *H04L 12/1475* (2013.01); *H04L 43/028* (2013.01); *H04L 63/101* (2013.01);
(Continued)

(58) Field of Classification Search
CPC ........ H04L 41/00; H04L 43/028; H04L 67/22; H04L 67/306; H04L 12/1475; H04L 63/101; H04L 63/102; H04M 2215/0192
(Continued)

(56) References Cited

U.S. PATENT DOCUMENTS 6,324,552 B1 * 11/2001 Chang et al. ................. 715/205
6,721,721 B1 * 4/2004 Bates et al.
(Continued)

FOREIGN PATENT DOCUMENTS

KR 2003-0060849 7/2003

OTHER PUBLICATIONS

DSTI/ICCP/IE, "Digital Broadband Content: Mobile Content New Content for New Platforms", May 3, 2005, pp. 1-74.*
(Continued)

*Primary Examiner* — Apu Mofiz
*Assistant Examiner* — Jared Bibbee
(74) *Attorney, Agent, or Firm* — Lapple Ubell IP Law LLP; Franklin Ubell

(57) ABSTRACT

A system and method of accessing web or network sites interfacing through a walled garden web server by dynamically expanding the reach of the walled garden on a user-by-user basis, based on the content that is returned to the user. The system includes a traffic analyzer and filter, a traffic forwarder, a traffic tagger, and a traffic redirector. A plurality of databases interface with the traffic analyzer and filter for appropriately manipulating web traffic from users by matching URL requests from a user with seed URLs in one or more of the databases. A depth parameter may be associated with a URL, indicating the number of times a particular domain has been traversed by a particular user. A depth rating database may be used to specify the number of times a particular URL may be accessed.

20 Claims, 8 Drawing Sheets

(51) Int. Cl.
*H04L 12/26* (2006.01)
*H04L 29/08* (2006.01)
*H04L 12/14* (2006.01)
*H04L 29/06* (2006.01)

(52) U.S. Cl.
CPC ............ *H04L 63/102* (2013.01); *H04L 67/22* (2013.01); *H04L 67/306* (2013.01); *H04M 2215/0192* (2013.01)

(58) Field of Classification Search
USPC ........................................................ 707/609
See application file for complete search history.

(56) References Cited

U.S. PATENT DOCUMENTS

| | | | | |
|---|---|---|---|---|
| 6,895,402 | B1* | 5/2005 | Emens ................ | G06F 17/3089 |
| 7,962,444 | B2* | 6/2011 | Maciocci ..................... | 707/609 |
| 8,095,547 | B2 | 1/2012 | Jeong et al. | |
| 8,554,192 | B2* | 10/2013 | Ramer et al. ................. | 455/418 |
| 2002/0065801 | A1* | 5/2002 | Goodwin et al. ................ | 707/1 |
| 2005/0234895 | A1* | 10/2005 | Kramer ............................ | 707/3 |
| 2007/0124280 | A1* | 5/2007 | Tateossian ........................ | 707/3 |
| 2008/0271120 | A1* | 10/2008 | Parkes et al. ..................... | 726/3 |
| 2008/0306782 | A1* | 12/2008 | Ephrati .................. | G06Q 30/02 705/14.41 |
| 2009/0077040 | A1* | 3/2009 | Moore .............................. | 707/3 |
| 2009/0204610 | A1* | 8/2009 | Hellstrom et al. ................ | 707/5 |
| 2013/0239199 | A1* | 9/2013 | Ong .................. | G06F 17/30887 726/12 |
| 2015/0066628 | A1* | 3/2015 | Ghosh .................... | G06Q 30/02 705/14.43 |

OTHER PUBLICATIONS

Patent Cooperation Treaty, International Search Report for Application No. PCT/US2013/027999, Dated Jun. 14, 2013, 9 Pages.

* cited by examiner

INTERNET ACCESS CONTROL USING DEPTH PARAMETERS

CROSS REFERENCE TO RELATED APPLICATIONS

This application claims the benefit of U.S. Provisional Patent Application Ser. No. 61/603,851, filed on Feb. 27, 2012, entitled "INTERNET ACCESS CONTROL USING DEPTH PARAMETERS," which is hereby incorporated by reference in its entirety.

BACKGROUND

1. Field of the Invention

The present invention relates to a method and system for accessing the Internet.

2. Description of the Related Art

There are now numerous networks through which users can access the Internet, including wired and wireless networks in licensed spectrum (such as 3G and 4G cellular), and wireless networks in unlicensed spectrum (Such as Wi-Fi and TV Whitespace networks). It is common industry practice to charge users an access fee for the use of these networks. In the case of many wired and wireless networks, the user must either buy access at the time they connect to the network or subscribe to a service prior to being able to use the network. A common practice in the wireless network access industry is to allow the user to connect to the network initially, with the intent of eventually providing them with an internet connection, commonly referred to as the pre-authorization state. While in this state, the user commonly starts their web browser, and requests their internet Home page. The network will intercept this request for the internet Home page, and for that matter nearly all other requests bound for the internet, and will present the user not with the page they requested, but instead with a page through which the user can either purchase the service, or provide identification for their service provider allowing them to login. Oftentimes, limited content is available prior to the purchase and login, that is, the user is allowed to go to a limited set of web content that is tightly controlled; the so-called "walled garden." Once a purchase and login are completed, the user is then provided with internet access.

For a user that elects not to login to the network, the content of the walled garden is oftentimes the only content that's available. Since the walled garden is commonly used by users that first connect to the network, it usually contains advertisements for services and goods as a way to monetize the network. In addition, information of local interest is often shown on the initial walled garden page; for example, at an airport, flight information is commonly provided.

There are a number of users that are not inclined to pay for access to a network, so the number of users that sees the initial walled garden is much greater than the number of users that ends up paying for internet use. The inventors have recognized that it would be desirable to provide additional controlled internet access to the user that heretofore only saw the walled garden and never signed up for service.

SUMMARY OF THE DISCLOSURE

An illustrative method provides access to shopping sites in the walled garden by dynamically expanding the reach of the walled garden on a user-by-user basis, based on the content that is returned to the user. This provides the user the ability to see a link or ad in the walled garden, then follow that link and complete a transaction. All the content needed to complete the transaction is dynamically added to the allowed content accessible through the walled garden on an as-needed basis, on a user by user basis. Since the transactions are tagged when the user is referred to the outside seller, any purchase completed provides credit to the operator of the walled garden who is an affiliate of the internet retailer.

Dynamic Whitelisting

Dynamic whitelisting is a method to allow access to a particular web page and all its related content, without allowing access to the entire Internet.

Current systems simply have static lists of rules. Rules are matched by URL and have an associated policy. The policy can be allow or deny. When a request is made to an allowed URL the content is forwarded to the client. When a request is made that matches a deny rule, a redirect to the walled garden is sent.

As an example: If ebay.com is listed as an 'allow' rule, the user could go to ebay.com and see some of the content of the ebay.com site. However, many of the auctions on ebay.com link to external sites, for example, flickr.com and photobucket.com to show pictures in the description of items on the site. As a result, listings look odd and the site becomes unusable. Even if a user persevered, and tried to complete a sale and pay through a payment provider like Paypal.com, the transaction would fail since that payment provider would not be whitelisted. Since the content of these sites is highly dynamic, it is practically impossible to come up with a static whitelist that would make the site usable. A similar situation exists with virtually any e-commerce site on the internet.

The dynamic whitelisting proxy adds a new possible policy value "seed." When a URL matches a seed rule, the content is loaded and parsed for any URLs, and then forwarded on to the client. The URL found in the content (child URLs) are added to the rule list, with a policy of seed. This makes the seed rules transitive, so something referenced by a seed rule is allowed to create further seed rules.

A typical request for a sponsor site is as follows: The client requests a URL. The proxy compares the URL with the rules, and finds seed rule. The content is loaded, parsed, and child URLs added to the rule list as seed rules. The content is then forwarded to the client. The client requests a child URL. The proxy compares the child URL with its rules and finds a seed rule. The content is loaded, parsed, and child URLs added to the rule list as seed rules. Etc.

Per the above example, if ebay.com were on the seed list, the links to paypal.com and flickr.com would add seed URLs for the specific content on those sites to the seed list, thus making related content available to the user, and ensuring the site will render correctly and provide full functionality. We should explicitly note that the URL seeds being dynamically added are very specific; i.e., one inclusion of a flickr URL does not result in unrestricted access to all of flickr.com The static whitelist would require foreknowledge of all URLs that a sponsor site refers to, the dynamic whitelist only requires knowing the initial URLs.

Per-User Whitelisting

There is an inherent vulnerability to allowing dynamic white-listing; if a user finds a way to navigate out of the sponsor site, they will start opening portions of the unsponsored Internet. If the dynamic whitelist is global, a different user coming to the for-pay site will be able to freely navigate the sites opened by other users. This lowers the value of paying for access, and will cannibalize sales of Internet access without providing sponsor compensation.

With per-user whitelisting, when content is scanned and child URLs are found, the child URLs are placed on a per-user list of dynamic rules, i.e., the extensions of the seed list happen on a per-user basis. This list is only used for this specific user. The power of this system is that, if one user finds a way to navigate through the dynamic white-list to a particular web-site, all users are not instantly able to navigate to that site directly.

Users can be identified by IP address, HTTP cookie, browser fingerprint, mac address, or any other suitable personally identifying information. These rules are flushed based on inactivity or other mechanism provided by the for-pay network (e.g., disassociation).

Depth Based Recursive Whitelisting

Depth-based recursive whitelisting adds an additional parameter to the previously specified dynamic whitelisting technique: a depth count. Rules are initialized with a positive count. When a rule is matched, the subsequent seed rules created have a count of their parent minus 1. When the count of a rule reaches 0, the system no longer creates new child seed rules.

This allows some amount of control of the limits of dynamic whitelisting. A user is allowed to go a certain depth into the site, but no further. The main advantage to this technique is allowing only limited browsing if the user escapes the intended site and to limit functionality of a site that's being opened.

An example would be a link to the flickr site to show images or video integrated in an eBay page. Once the image has been linked, the user should be able to freely navigate the flickr site. Judicious use of the depth parameters in seed URLs can prevent these types of unintended internet access.

Resource Property Based Access Control

With traditional whitelisting, the only parameters examined for determining if a resource is allowed are the URL, the destination host, and the destination IP. Resource property based access control extends this by allowing inspection and policy based on any property of the resource.

One possible use of this is blanket allow rules for a certain content type. For example, the proxy can be configured to permit any image, regardless of URL. As images are generally not interesting on their own, this does not materially decrease the value of the for-pay access. The advantage of this capability is if the content parser is not able to find all the possible URLs that a site uses, any images not found will still be loaded successfully.

Another application of this is to only return 302-redirects for certain content types. A 302-redirect to a walled garden has a very high cost for the client's browser. It generally attempts to load a large amount of content and then is not rendered at all. This greatly reduces the performance of page loads on sponsored sites, and does not facilitate the user being directed to the walled garden.

In addition to content type, content length, referrer, status code, cookies, etc. can all be inspected and used to fine tune proxy behavior.

Content Based Access Control

As with resource property based access control, the dynamic proxy can also inspect the content of the requested resource to determine the policy action followed. By inspecting the content for known magic bytes at the beginning of the file, and using this to determine true content type, policy behavior can be determined.

Another use is to let the proxy read the content and generate a hash of the content. This hash is then used to compare to a known list of blocked content, i.e., content that violates the terms of use for the network, copyright law, etc.

Cost Based Access Control

With traditional whitelisting, no concept of a user session is maintained. With dynamic whitelisting, we track a user's session and all their activity over that session. This tracking can be used to aggregate usage and compile a total cost of service for the user. The dynamic whitelist proxy can then control access based on cost of service for a user.

With a traditional for-pay network, the only significant network load comes from users that have paid for access. In a for-pay network with sponsor access, a large number of sponsor clients may have to be supported. This will require increasing the capacity of the network. To mitigate this cost, cost based access control can be used.

An example of this is a sponsor client browsing a sponsor site that includes a large amount of video content. The video content will be comparatively expensive to serve and detrimental to the overall performance of the network. By blocking access to certain content determined to be too expensive, or cutting off a sponsor client after it has consumed a certain budget, the overall quality of service of the network can be maintained.

Sponsor Based Access Control

Another method of selectively allowing content from sponsors is by allowing the sponsor to directly control the behavior of the dynamic proxy. In this scenario, when the sponsor returns content to the proxy, it can tag the content as allowed or denied. The proxy can then inspect the response and behave accordingly. This method allows the sponsor site fine-grained control of what content is allowed to sponsored users.

For example, a for-pay network could offer per byte pricing for access to the sponsor content, paid by the sponsor. In this scenario, the sponsor could allow simple content (static images and text) but deny more complicated content (audio and video). This allows the sponsor to control their costs, without a large dependency on the configuration of the proxy.

Affiliate Tracking Injection

To be able to monetize the client access at sponsor sites, the sponsor site needs to be able to attribute revenue to the for-pay network. In existing systems, this is accomplished by having the user click on a link, and the link embedding affiliate tracking information. If the user manually types in the URL instead of clicking, no tracking is performed and the commission will not be received by the for-pay network.

The dynamic whitelist proxy can accomplish this through a more powerful facility, affiliate tracking injection. When a rule is matched, it can contain an associated transform to perform on the request, to add the appropriate tracking information. This tracking information can take the form of URL parameters, URL rewriting, header insertion, cookie insertion, etc. Once the request has been transformed, it is forwarded on to the sponsor site, ensuring correct tracking of client behavior.

The advantage of the dynamic proxy doing the affiliate tracking insertion is that users are not able to bypass the tracking. This ensures that the commission or other monetization will always occur.

Associated Content Injection

While monitoring content in the way described, we have a significant amount of information about the content the user is looking at. For example, we will not just know a user is looking at amazon.com or ebay.com, in many cases we know exactly what product, or product category a user is looking at. We also know the path a user has followed to get here, and other similar product or product categories the user has looked at in the path they took to get to this point.

With this detailed information, it is possible to serve extremely targeted ads to a user. Dynamically injected ads on the content may be shown to a user to entice them to consider sponsorship offerings from partners. In one such implementation, the customer may be steered to purchase a product from the retailer that pays the highest commission.

BRIEF DESCRIPTION OF THE DRAWINGS

The features, objects, and advantages of the present disclosure will become more apparent from the detailed description set forth below when taken in conjunction with the drawings, wherein.

DETAILED DESCRIPTION

Figure 1:
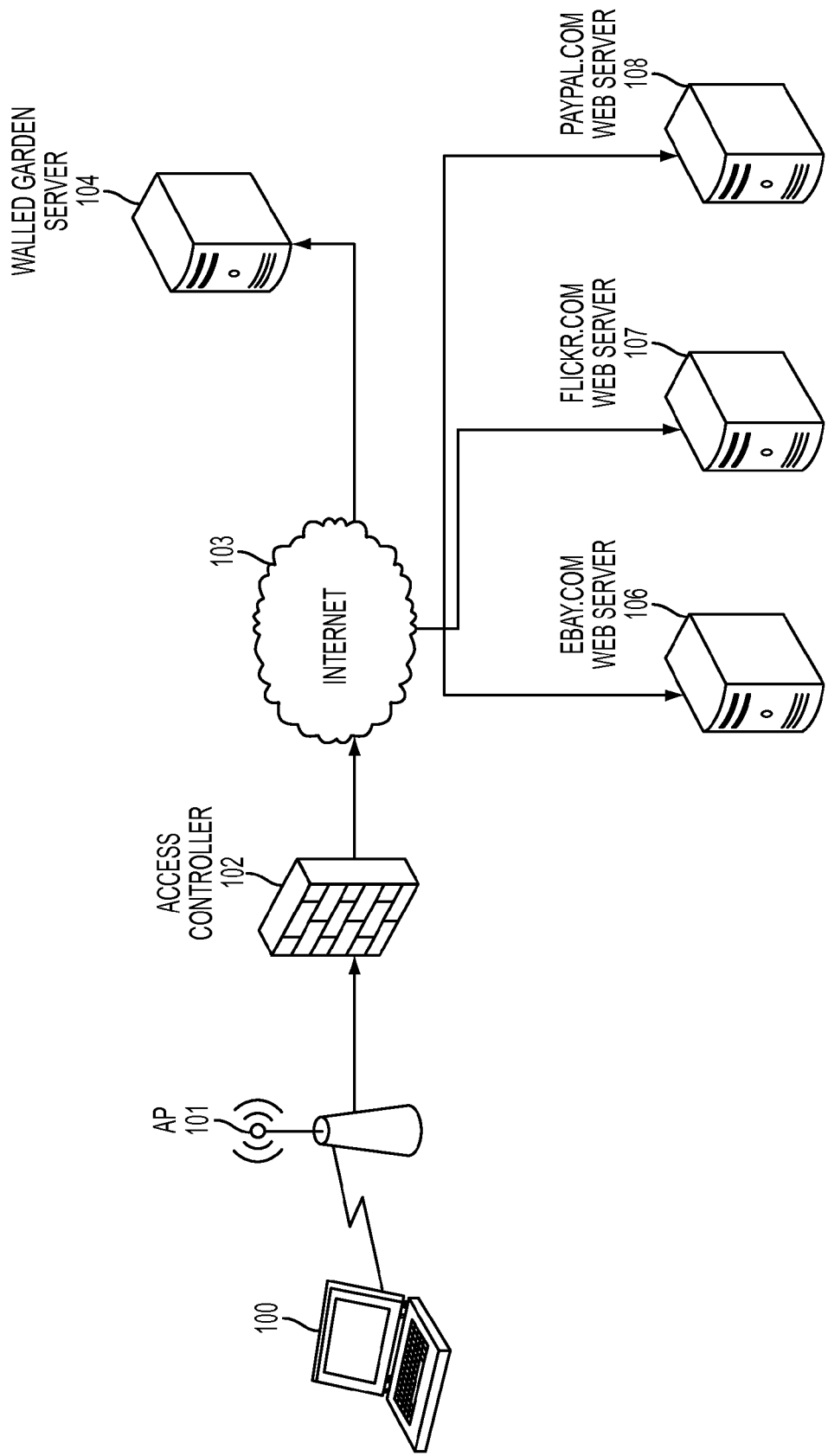
FIG. 1 shows a system diagram for a network setup used for internet access, according to an illustrative embodiment.

FIG. 1 shows a typical network setup that might be used for public internet access and a simple internet access scenario.

Mobile device 100 is controlled by a user seeking internet access, this device can take many forms, i.e., it can be a laptop, mobile phone, tablet device or any other type of device commonly used for internet access. The end user uses this device to attempt to access the internet, for example by opening a web browser on the device.

The device connects to access point 101. In this example we've shown a wireless connection between the device and the access point, but the approach described here works equally well for devices connected to a particular network by any method, i.e., a cellular radio connection or wired connection could also be used.

The access point 101 is in turn connected to the Internet 103 through access controller 102. The role of access controller 102 is to provide a gateway function between the mobile device 100 and the internet 103, typically providing such functions as user authentication, traffic accounting, and restriction of internet access prior to obtaining sufficient user authorization.

The access controller 102 connects to the internet 103, and has the ability to provide mobile device 100 with internet access to reach websites out on the internet, such as the ebay.com web server 106, the flickr.com web server 107, and the paypal.com web server 108. These specific servers are examples of websites available on the Internet. The same technologies demonstrated here for these example websites will work for any other website.

Access to these public internet websites (106-108) will typically be restricted to mobile device 100 until it has successfully authenticated to access controller 102. Up to the point of such a successful authentication, access controller 102 will respond to any request from mobile device 100 by sending a response to the device indicating it can serve content from walled garden server 104. This concept is detailed in a flowchart in FIGS. 2B-2C. A wireframe example of the content returned from walled garden server 104 is described in FIG. 3.

Figure 2A:
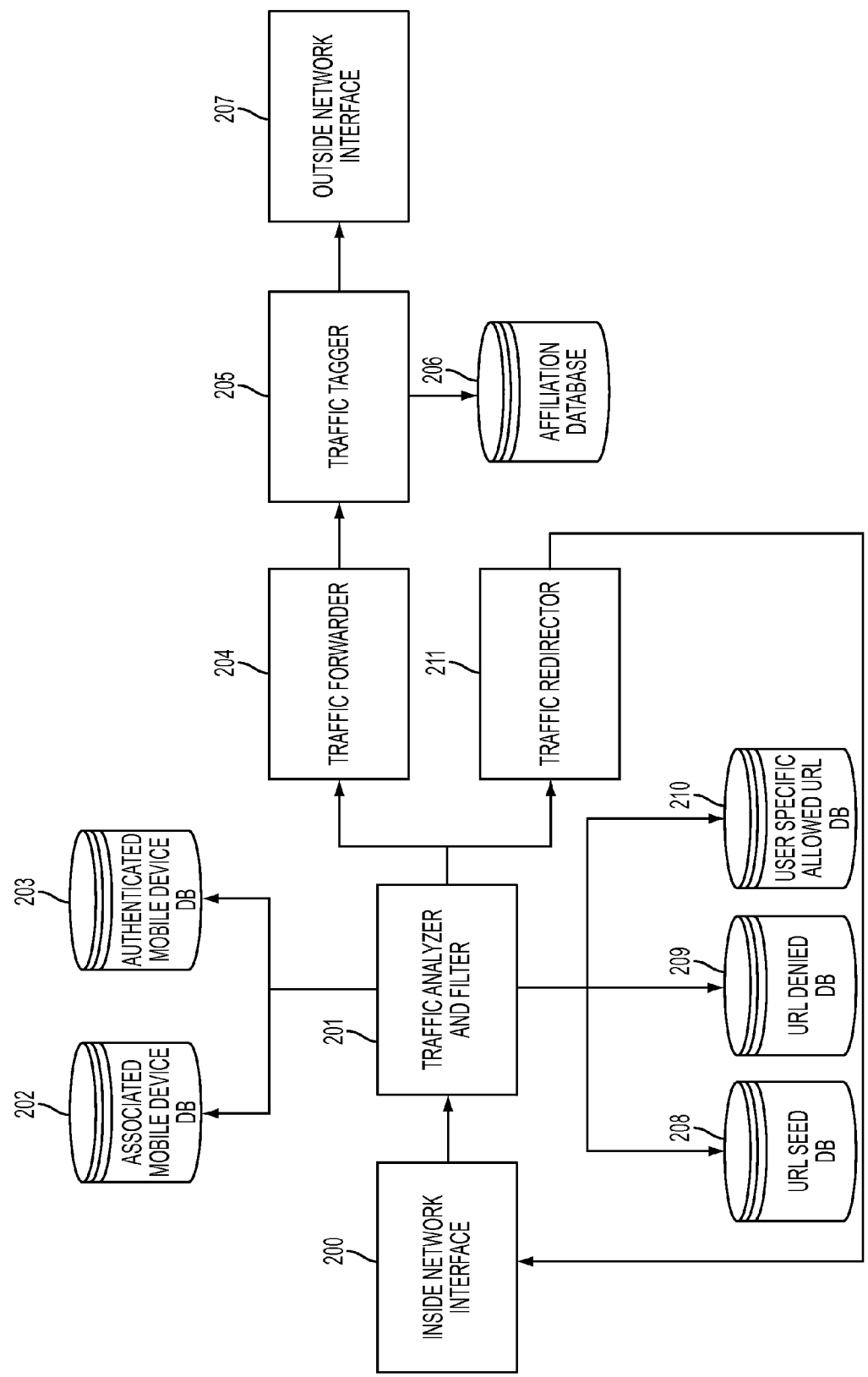
FIG. 2A shows a block diagram of the internal elements relevant to the access controller described in FIG. 1, according to an illustrative embodiment.

In addition, access controller 102 will restrict all internet traffic from and to mobile device 100 unless such traffic is destined for walled garden server 104, until mobile device 100 has successfully authenticated itself to access controller 102, subject to the process demonstrated in FIG. 2A.

FIG. 2A shows the internal elements relevant to an access controller, for example, the access controller 102 shown in FIG. 1.

All traffic from mobile devices 100 shown in FIG. 1 is received through network interface 200, and is in turn passed to traffic analyzer and filter 201, which inspects each network request being sent through the access controller.

Each mobile device is identified by a unique identifier, which could be its hardware network address and IP address, or any other unique identifier, and stored in the associated mobile device database 202. Inside this associated mobile device database 202, a unique identifier exists for each mobile device, which is randomly generated when the device is first seen by the access controller. This unique identifier is used by other databases and elements in the system as a primary key to uniquely identify a device.

Traffic analyzer and filter 201 will query associated mobile device database 202 to obtain the unique ID. If a device is new to the system, a unique ID will be generated for the device in associated mobile device database 202. Traffic analyzer and filter 201 will then query authenticated mobile device database 203 using the device's unique ID, and determine if the device has been approved for unrestricted internet access. If it finds that the device has been approved for unrestricted internet access, it will send traffic to traffic forwarder 204 uninhibited and unaltered.

Traffic forwarder 204 will in turn send any allowed traffic to traffic tagger 205. Traffic tagger 205 will check the address being requested against affiliation database 206.

Affiliation database 206 contains a list of internet sites with which the operator of the gateway has a deal to derive affiliate revenue in the form of commissions, or another agreement that can result in additional revenue for the operator of the gateway, or discounts or deals for end user. In one example of such a mechanism, the address is to be modified by addition of parameters to the user request being made. In another example, a cookie is to be placed on the user's device. Other mechanisms are possible as well.

If traffic tagger 205 finds a match in affiliate database 206, it will modify the request being made, or send the user a cookie prior to forwarding the request, or use other equivalent mechanisms to tag the request coming from the user, or to tag the user's device as one referred by the operator of the gateway. This transaction is transparent to the end user, i.e. the end user does not have to click additional links or look at additional interstitial requests.

Traffic tagger 205 will in turn send this traffic to outside network interface 207, from where it can go out to the internet. It should be expressly noted that this traffic flow will only occur for previously authenticated devices.

Figure 2B:
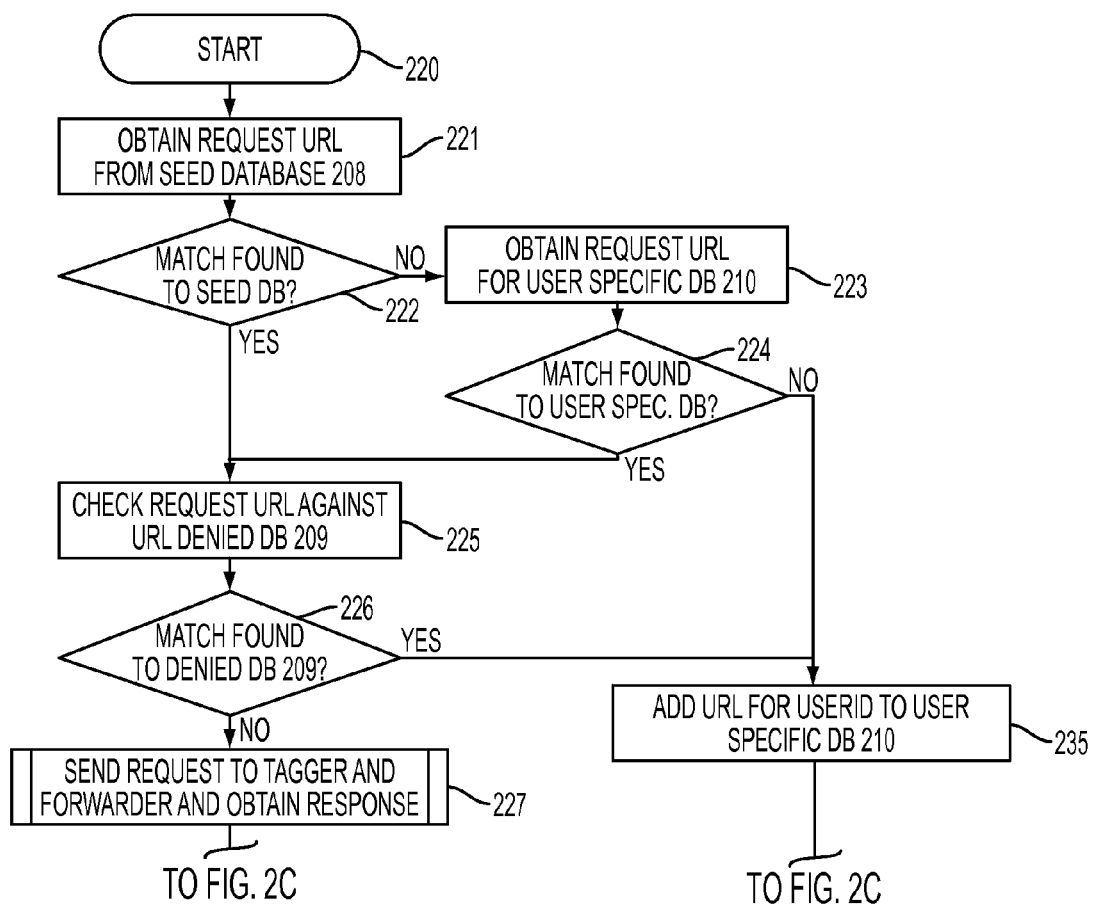
FIG. 2B shows a flowchart of a process used by the traffic analyzer and filter described in FIG. 2A for processing traffic for non-authenticated users, according to an illustrative embodiment.
Figure 2C:
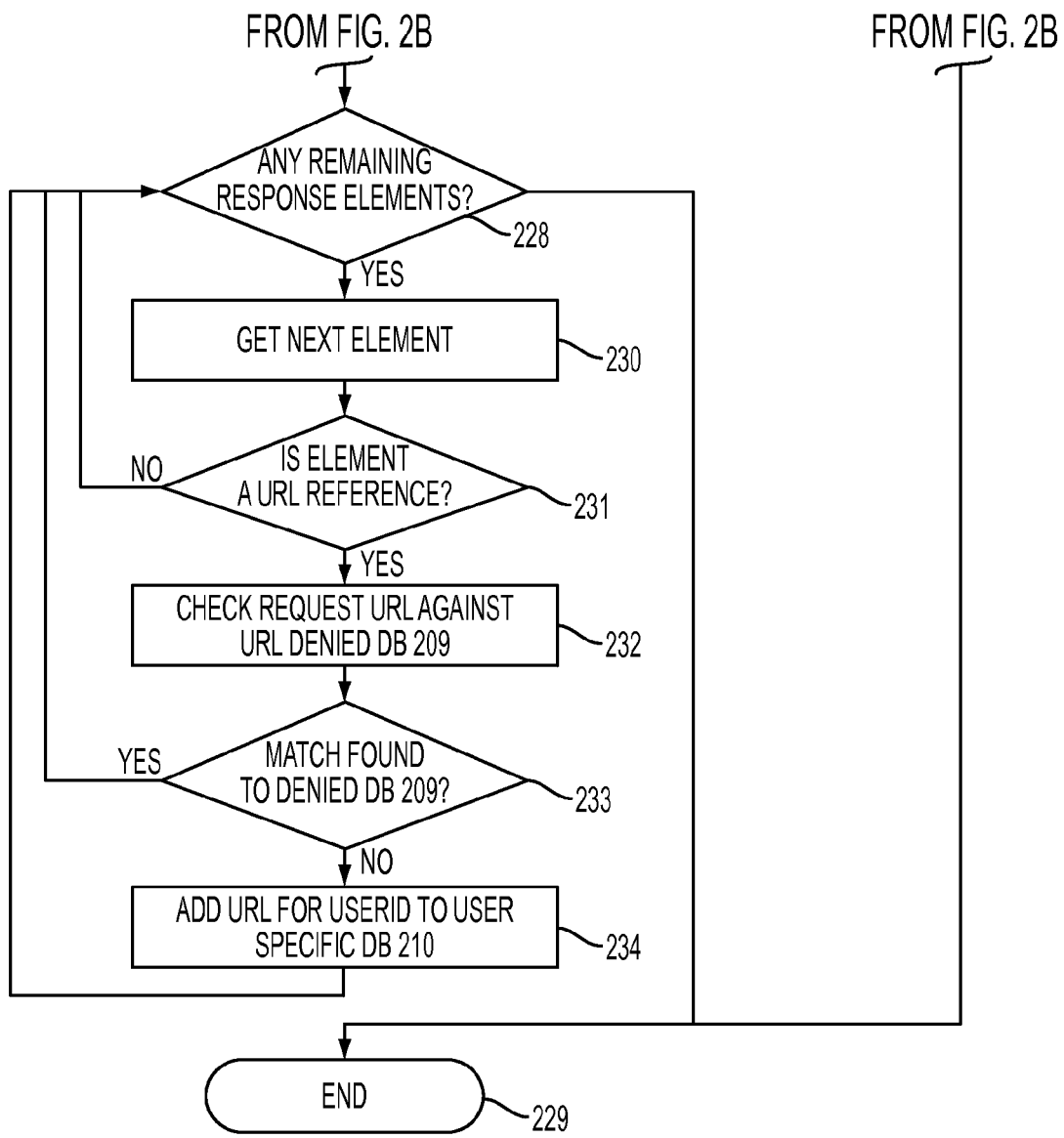
FIG. 2C shows a flowchart of a process related to the process described in FIG. 2B used by the traffic analyzer and filter described in FIG. 2A for processing traffic for non-authenticated users, according to an illustrative embodiment.

If traffic analyzer and filter 201 determines the device has not been previously authenticated, it will consult the URL seed database 208, URL denied database 209, and user specific allowed URL database 210 to determine whether traffic should be forwarded or not. One example of the detailed flow of this process is shown in FIGS. 2B-2C. If, as a result of this analysis, it is determined that traffic can be forwarded, traffic analyzer and filter 201 forwards the traffic to traffic forwarder 204. The mobile device sees the content requested, and traffic analyzer and filter 201 updates user specific allowed URL database 210, for example, according to the process as shown in FIG. 2B-2C. If on the on the other hand the analysis determined traffic should not be forwarded, the request is sent to traffic redirector 211, which results in the mobile device not seeing the content it requested, but rather a re-direct to different content which will provide the user with instructions on how to authenticate, thereby blocking their access to the internet until successful authentication.

FIG. 2B describes a process used by the traffic analyzer and filter 201 when processing traffic for non-authenticated users.

Step 220 is the start of the analysis process for a new incoming request, for example, from mobile device 100 in FIG. 1

Step 221 attempts to retrieve the URL requested, for example, from URL seed database 208. This step will return either a match or a failure.

Step 222 checks whether there was a failure. If so, step 223 attempts to retrieve the URL requested, for example, from user specific allowed URL database 210. This step will return either a match or a failure. This result is checked in step 224.

If step 222 or step 224 found a match, execution continues with step 225. In step 225, the requested URL is retrieved, for example, from URL denied database 209. This results in either a success or failure. Step 226 checks if there was a match in the URL denied database 209. If none is found, this request is permitted and execution continues with step 227.

If in step 224 no user specific match is found in user specific database (e.g., user specific database 210), or, in step 226, a match is found in the denied database (e.g., URL denied database 209), the request is not honored and is sent to the redirector in step 235, where the URL for the user ID is added to the user specific database. Execution then completes in step 229.

Figure 2D:
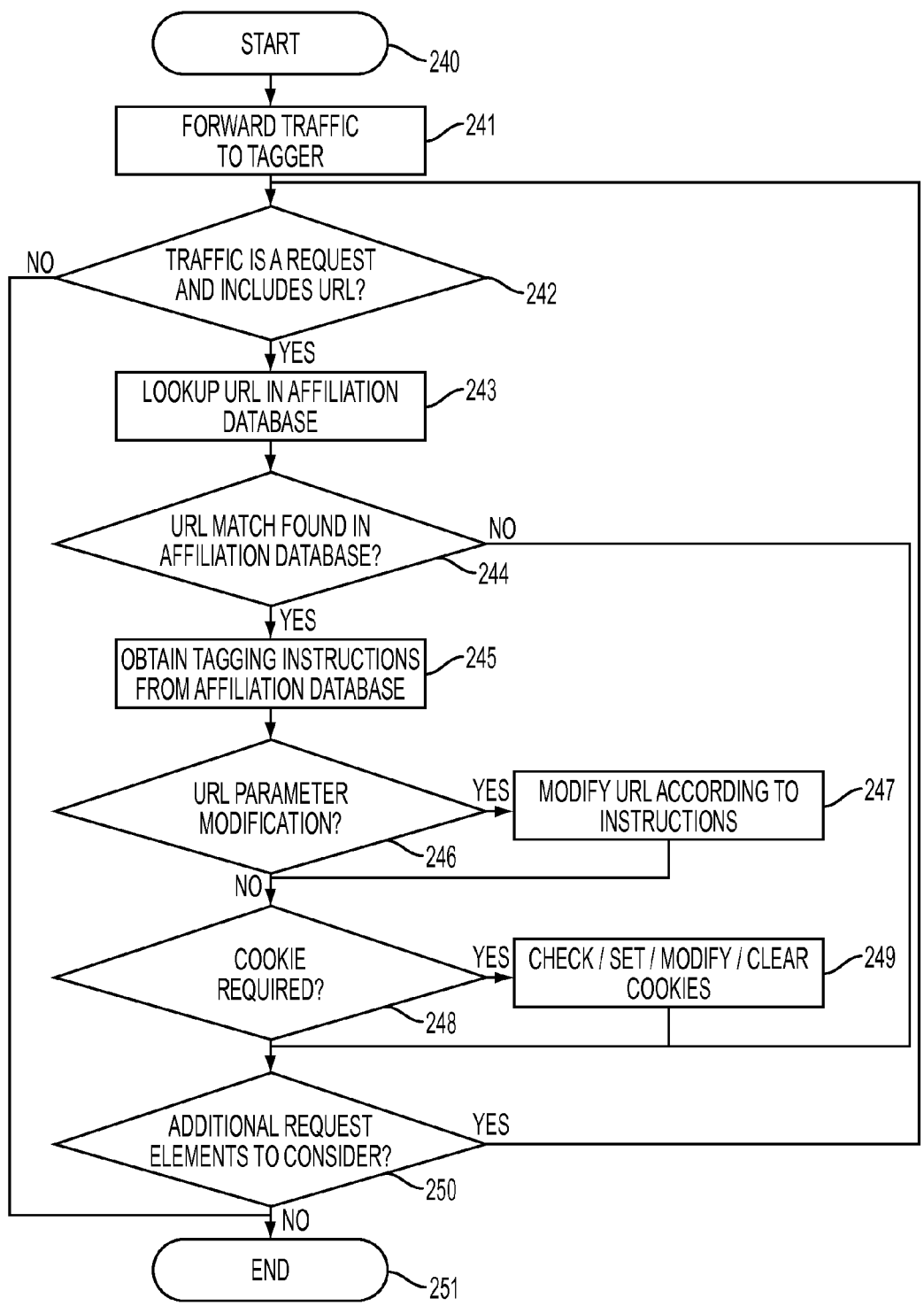
FIG. 2D shows a flowchart of a process for forwarding and tagging traffic, according to an illustrative embodiment.

Step 227 will send the request to be forwarded and/or tagged, for example by sending the request to traffic forwarder 204, which in turn sends the requests to traffic tagger 205, a process further detailed in FIG. 2D, and then starts analysis of the response.

FIG. 2C continues the process described in FIG. 2B. Step 228 checks if any elements remain in the response; if none remain, the process stops at step 229. Otherwise, the next element of the response is obtained in step 230.

In step 231, the element is checked to determine if it contains a URL. If not, this element is not interesting, so execution returns to 228. If this element contains a URL, step 232 requests this URL in the denied database, for example, URL denied database 209, after which step 233 checks for a match.

If the process finds in step 233 that this element is part of the denied database, the process returns to step 228 to consider the next element. Otherwise, step 234 is executed, and this specific element is added to a user specific database, for example, the user specific database 210.

FIG. 2D describes in more detail the forwarding and tagging process. Note that this process is applied to both non-authenticated traffic as described in FIGS. 2B-2C, and to traffic for authenticated users as described in FIG. 2A. This distinction is significant, as it allows the tagging methodology to be applied to all traffic on a network, providing the operator of an access controller, such as access controller 100 of FIG. 1 to monetize all traffic passing through the access controller.

Step 240 starts the forwarding and tagging process for all traffic from an end user device, such as the mobile device 100 FIG. 1.

In step 241, traffic forwarder, such as traffic forwarder 204, forwards all allowed traffic to a traffic tagger, such as traffic tagger 205. The functions typically contained in a traffic forwarder can include Network Address Translation and Port Address Translation.

In step 242, the traffic tagger analyses the traffic to determine whether the traffic is a request from the end user or mobile device that can be tagged, for example a HTTP web request, and, if so, if the request includes a URL, which is the key used later to match against a database. If both conditions are met, execution continues with step 243. Otherwise, the process continues to step 251.

In step 243, traffic tagger 205 looks up the URL in the request in an affiliation database, such as affiliation database 206. This lookup will either result in a match or a failure.

The result of the lookup is evaluated in step 244. If a URL match was found in the affiliation database, execution continues with step 245. Otherwise, execution continues with step 250.

Step 245 obtains tagging instructions from the affiliation database. These instructions can take numerous forms. For this example, two approaches are demonstrated, however, many other analogous approaches are possible.

In step 246 the tagging instructions are checked to see if their form is a simple URL parameter modification. These instructions would take the form of instructions with parameters to add to the request URL, remove from the request URL, or modify on the request URL. If such instructions exist, execution continues to step 247, otherwise execution continues to step 248.

Step 247 will modify any request URL according to the instructions obtained in step 245. Since this modification is made prior to the request being serviced by the site requested, all traffic processed by the site will be equipped with the tags in question. The instructions for URL modification are in such a form that repeated application of the process will not cause a problem. As an example, instructions to add an affiliate tag can be written in such a way that when a URL with a matching tag is seen, no additional tag will be added. Since numerous requests to a website are typically made in the process of an end user interacting with a given website, this technique ensures that the normal operation of the site is not compromised.

Step 248 determines if the instructions from the affiliation database obtained in step 245 call for setting or clearing of cookies. If they do, execution continues with step 249. Otherwise, execution will continue with step 250.

Step 249 will check for, set, modify, or clear cookies on the end user device 100. The cookies are set by exchanging one or more requests between the access controller, for example, access controller 102, and the end user device, for example, mobile device 100. It should be noted that the cookies are cleared, modified, or set prior to the end user interaction with the target website, thereby ensuring that all traffic for the user will be appropriately tagged and no loss occurs.

Step 250 checks if additional elements of the request are to be considered, in which case execution returns to step 242. If no additional elements of the request are to be considered, the process completes in step 251.

Figure 3:
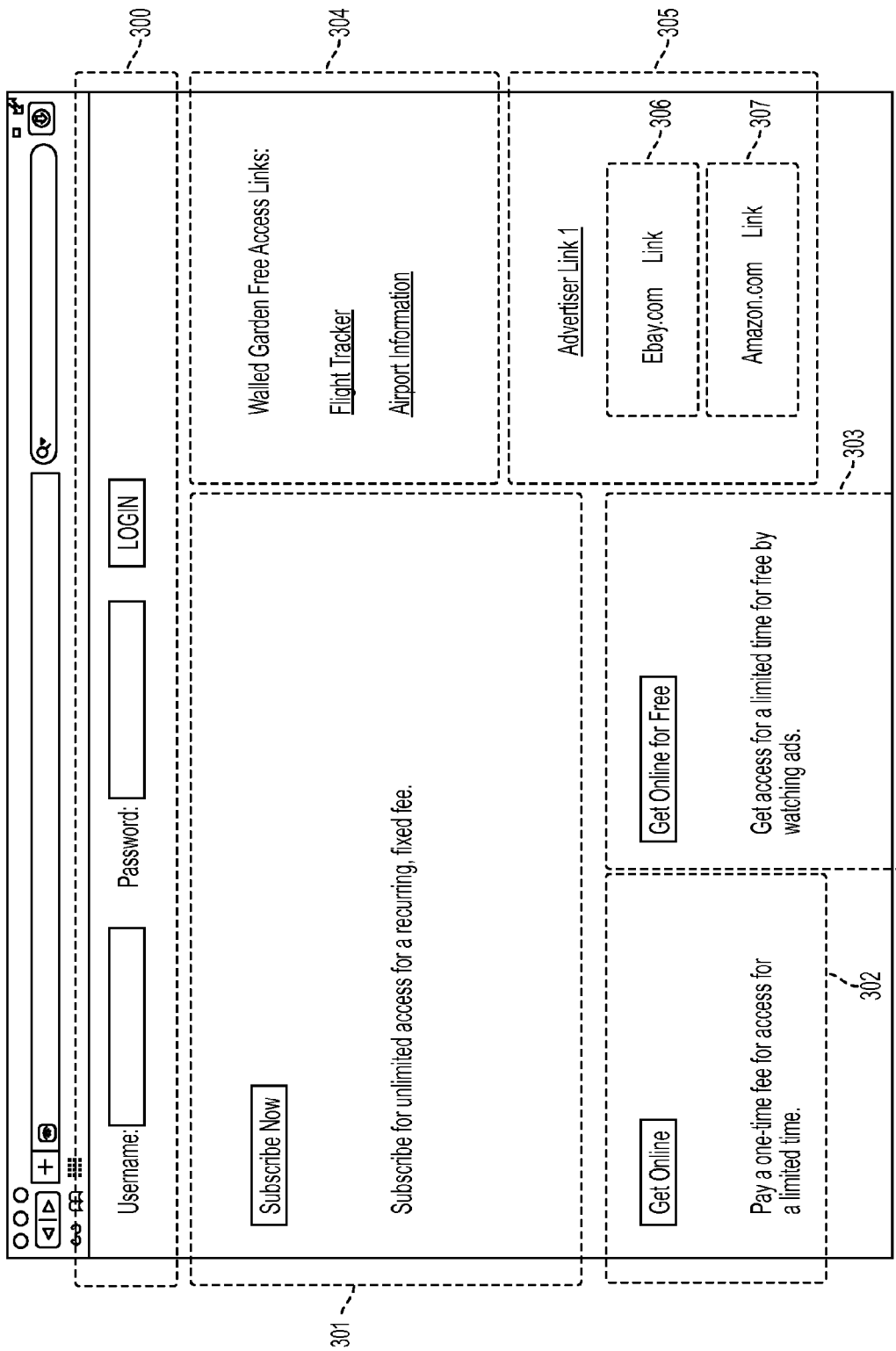
FIG. 3 shows a display of content provided from the walled garden server of FIG. 1, according to an illustrative embodiment.

FIG. 3 shows an example of what the content from a walled garden server, for example the walled garden server 104 of FIG. 1, might look like. FIG. 3 is included as an illustrative example to demonstrate concepts explored in following figures. FIG. 3 has been marked up with a number of dashed boxes to identify content elements to which this description will refer.

Box 300 shows the portion of the page that deals with authentication of an existing user that has signed up for the service and has credentials. In this section, the user can provide their login credentials to be authenticated on the network, after which an access gateway (e.g., access point 101 and/or access controller 102 of FIG. 1) would provide open and unrestricted network access. Until the user goes through the process of authentication, internet access will be restricted.

Box 301 identifies the section of the page that allows the user to become a subscriber and sign up for new, paid service. Through the use of this section, the user is able to pay for service and generate credentials, which they can subsequently use to login to the network using the content in box 300. In this example, box 301 contemplates a recurring subscription, whereby the user contracts to be able to use the service repeatedly for a fixed fee.

Box 302 offers another paid use option, this one allowing the user to establish credentials for a one-time use scenario. After the user has obtained these credentials, they will be able to authenticate for the use of the service using the content in box 300.

Box 303 offers yet another option to use the service, providing users with a free usage option for a limited time, during which they have to watch ads, and which will provide only limited bandwidth.

Box 304 provides links to content that is accessible for free from the walled garden page, typically consisting of links to useful information the user might like to see prior to login. For example, since the walled garden page may be shown or intended for an airport, the links contained are information that is of interest to the flying public. When a user selects one of these links, they are allowed to connect to the websites that contain this information using the process of walled garden access to outside websites, consisting of a fixed list of content and addresses the user is allowed to see without having to pay.

Box 305 shows an advertising box displayed on the page. A click on the ad may result in the user's access to the web page of the vendor to which the ad refers. This access may be facilitated by a static list of addresses to which the user is allowed to connect. For some websites, this approach works well since they are self-contained, or have a limited number of related sites from which they need to obtain contents. For such sites, the list of URLs that needs to be accessible is limited, and can be exhaustively listed in a static whitelist.

Box 306 provides an example of a link to a site that will not work well with a static whitelist. Much of the content on the ebay.com site is user generated, and contains links to outside websites. Clicking the link in box 306 may obtain content from server 106 in FIG. 1. As the user is browsing the ebay.com website content, they are likely to come across user listings that include pictures from a number of picture sharing websites used in item descriptions. For example, some of these pictures might be stored on the flickr.com website, illustrated as server 107 in FIG. 1. It is not desirable to make all of flickr.com accessible to all users, as that would provide a significant amount of internet access for free, yet it is desirable to make the relevant content of flickr.com available for the user to be able to view the complete ebay.com listings with pictures when the user is browsing eBay. This may be facilitated by various of the steps or processes described in FIGS. 2A-2D. If the user then decides to complete a transaction on eBay, they are likely to pay with PayPal, eBay's payment service which is shown as server 108 in FIG. 1. Here again, it is desirable to allow the user access to PayPal as a result of completing a transaction on eBay, while otherwise limiting their access to the PayPal site. This too, is facilitated by various of the steps or processes described in FIGS. 2A-2D.

Box 307 provides another example of a different type of site that will not work with a static whitelist. The amazon.com web properties refer to a very large number of URLs that are not directly inside the amazon.com domain. In addition, much of the content that does reside on the amazon.com domain should not be made available to a user, since it is not directly related to the amazon.com shopping experience. Though the use of static white lists, it is difficult to provide a good shopping experience on the amazon.com website.

The two examples provided here are merely illustrations of a systemic problem; the same limitations shown in these examples exist of many other websites as well. The various steps or processes described above are generically applicable to all web content, not just to the example sites explicitly shown or discussed.

Figure 4A:
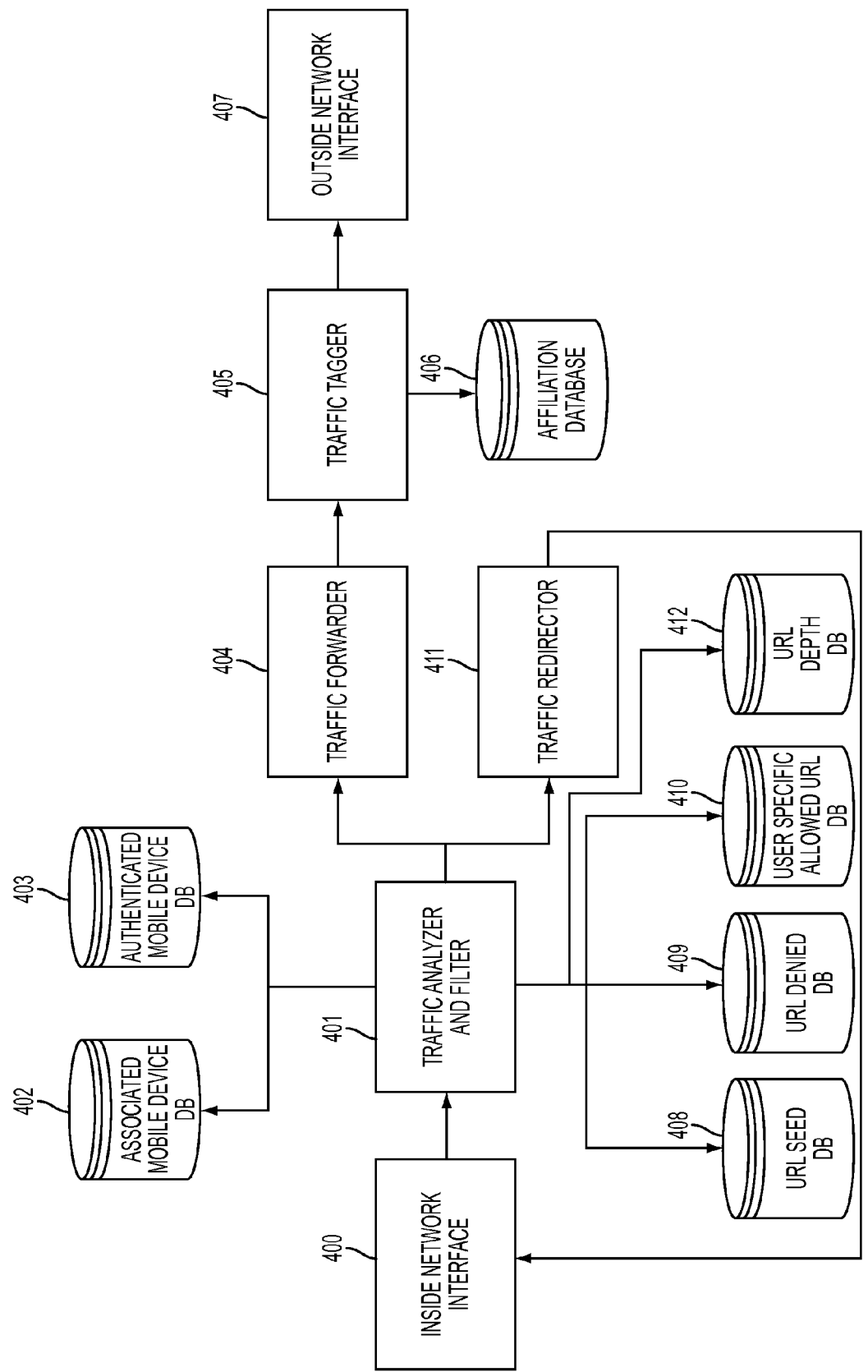
FIG. 4A shows a block diagram of alternative internal elements relevant to the access controller described in FIG. 1, according to an illustrative embodiment.

FIG. 4A shows a refinement of the system shown in FIG. 2A. Items 400-411 may be the same or similar in function and description to items 200-211 of FIG. 2A, respectively, and are included for reference and context.

Item 408 represents a URL seed database, indicating which URLs may form the start of a user's browsing experience. This database contains a row for each URL a user is allowed to visit as a seed URL. The URL may be specific, i.e., fully formed, or may be stored in the form of a regular expression, i.e., provide a matching pattern of a number of URLs that a user would be allowed to visit. An example of a fully formed URL might be http://www.amazon.com. An example of a regular expression URL might be .*\.ebay\.com\/.*

Item 409 represents a URL denied database, indicating which URLs a user may not traverse as part of their browsing experience. This database also contains a row for each URL a user is allowed to visit as a seed URL. The URL may be specific, i.e., fully formed, or may be stored in the form of a regular expression, i.e., provide a matching pattern of a number of URLs that a user would be allowed to visit. An example of a fully formed URL might be http://www.google.com. An example of a regular expression URL might be .*\.twitter\.com\/.*

Item 410 represents a list of specific URL to which a user has gained access through the dynamic whitelisting process. This database will contain a row containing a user ID and a specific URL to which the user has been granted access. The URL can again be in the form of a specific link, as determined by the analysis process described in FIGS. 2B-2C, or in the form of a specific link or expression as added by the analysis process described in FIG. 4B below.

Item 412 represents a specific URL Depth database. The contents of this database are similar to the database of item 408, with the addition of the maximum depth to which the user is permitted to follow links on a given seed URL. A typical row in this database contains the seed URL similar to item 408, along with the maximum allowed depth integer, combined in a single row per website entry. Again, specific or regular expression URLs are permitted here. Item 412 is an additional database that contains detailed information for given URLs the user may come across. It may be used by traffic analyzer and filter 401 in the process described in FIG. 4B to determine whether related URLs should be permitted or denied.

Figure 4B:
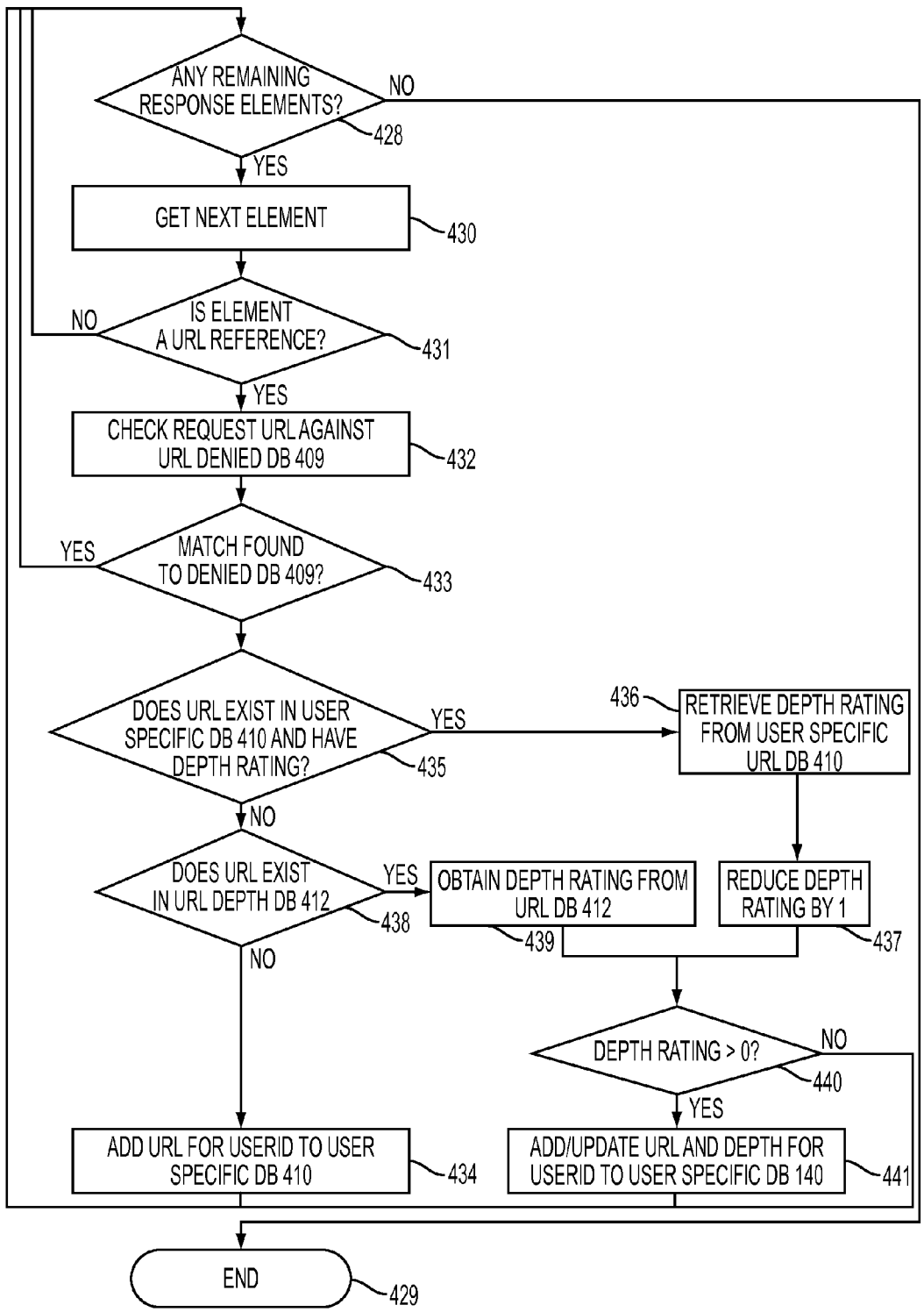
FIG. 4B shows a flowchart of an alternative process for processing traffic for non-authenticated users, according to an illustrative embodiment.

Steps 428-434 of FIG. 4B may be the same or similar to steps 228-234 of FIG. 2C, respectively, and all are included for reference and context.

In step 435 the user specific URL database, such as user specific allowed URL database 410, is checked not just for existence of a given URL, but in addition is checked for a depth parameter associated with the URL, which indicates how many times a link for this given domain has been traversed by the user in context of this seed URL. If such a depth parameter is found, execution continues to step 436, otherwise execution continues to step 438.

In step 436 the user specific depth rating associated with the URL is retrieved from the user specific URL database, such as user specific allowed URL database 410, and remembered as the depth rating.

In step 437 the depth rating is reduced by 1 to generate a new depth rating for this URL.

Alternately, if no user specific depth rating was present according to step 435, step 438 checks an URL depth database, such as URL depth database 412, to see if a specific depth listing is present for this given URL. If one is found, execution continues with step 439, otherwise execution continues with step 434.

In step 439 the depth rating is obtained from the URL depth database and assigned as the depth rating.

In step 440 the new depth rating is verified to see if it is greater than 0, which indicates that the full depth the user is allowed to follow links on this URL has not been exceeded. If the depth rating is found to be greater than 0, execution continues with step 441; otherwise execution continues with step 428.

Step 441 updates the user specific URL database, such as user specific allowed URL database 410, for this URL with a new depth rating; this update is made either in the form of the addition of a new record to the database, or the update of an existing record in the database, resulting in the ability of a user to follow a link, or to not be able to follow it in subsequent requests.

As an example, if flickr.com were added to URL depth database 412 with a value of 1, and ebay.com had been added to URL seed database 408, then, in the example described in FIG. 3 where a user visited eBay and saw a listing that contained pictures from flickr.com, the user would be able to see the specific flickr content referenced by the eBay listing, without being able to browse other parts of the flickr website. The result would be a fully functional eBay experience, without allowing full access to the flickr website.

Databases such as those disclosed in FIGS. 2A and 4A may comprise computer readable storage medium or media with apparatus comprising one or more computers or digital processors or microprocessors or other devices configured to accomplish read/write operations with respect thereto.

In one embodiment, the processes illustrated by the flow charts of FIGS. 2B, 2C, 2D, and 4B, as well as blocks 401, 404, 405, and 411 of FIG. 4A may be implemented in software stored on a computer readable storage medium or media and executed by a suitable apparatus comprising, for example, one or more digital processors, computers, microprocessors or other devices.

"Selection" of various links and other items presented on the display screen or web page of FIG. 3 may be accomplished with respect to a computer display screen, mobile device display screen, or monitor or other display by various point and click or point and touch operations accomplished by various well-known devices such as, for example, a conventional mouse, keyboard, track ball, touch sensitive screen, or other data entry or input/output device.

In one embodiment, as noted above, web pages are supplied by a walled garden server 104, which may employ, in one embodiment, a server-client system comprising of a server-based website operating over the Internet. As those skilled in the art appreciate, the Internet is comprised of a large number of computers and computer networks that are connected via various communications protocols (e.g., HTTP, FTP, POP3, SMTP) that utilize numerous technologies for delivering functionality to a client computer. The interconnected computers exchange information using various services including the World Wide Web ("WWW"). The WWW service allows a server computer and application to provide storage of files and manage the delivery of functionality predominately through what is referred to as web pages. Navigation to these unique web pages on the network is specified using a Uniform Resource Locator ("URL") that identifies the computer server that stores the files and the name of the file of interest. A person with a computer and a software system referred to as a "browser" can connect to the network such as the Internet via a telephone line, DSL connection, or other means to gain access to the server and the web pages that deliver the active technologies and information and the accompanying ability to interact with the information and functionality presented.

Thus, in one embodiment, the walled garden server 104 may comprise a server engine comprising one or more computers, or servers, associated memory and server software such as a server operating system and server application programs. In various embodiments, software, including, but not limited to, server software and operating systems or other software for implementing the disclosed processes and procedures described above may be stored on various forms computer readable medium or media or computer readable storage medium or media.

For the purposes of this disclosure, a computer readable medium stores computer data, which data can and typically does include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desire information or data or instructions and which can be accessed by a computer or processor. In various embodiments, when suitable computer program code is loaded into and executed by a computer, the computer becomes a specially configured apparatus.

Those skilled in the art will appreciate that various adaptations and modifications of the just described preferred embodiment or embodiments can be configured without departing from the scope and spirit of the invention. Therefore, it is to be understood that, within the scope of the appended claims, the invention may be practiced other than as specifically described herein.

What is claimed is:

1. Apparatus for controlling wireless internet access comprising:
    an access point configured to communicate with a mobile device and to receive a connection request from said mobile device;
    a walled garden server;
    an access controller comprising one or more digital processors, computers or microprocessors and configured to communicate with the access point and to communicate over the internet with the walled garden server;
    wherein the access controller is configured to respond to a connection request from the mobile device by sending a response to the mobile device indicating that the access controller can serve content from the walled garden server to the mobile device, such content comprising selected free content and selected non-free content;
    wherein the walled garden server is configured to provide one or more free access links to the mobile device to one or more internet sites to which internet access is controlled through use of:
        a URL seed database indicating which of a plurality of URL's may form the start of a browsing experience by a user of the mobile device on said one or more internet sites as to which a free access link or links have been provided;
        a URL denied database comprising URL's which the mobile device may not traverse while browsing;
        a specific URL database comprising a list of specific URL's to which the mobile device has previously been granted access; and
        a specific depth database storing a plurality of seed URL's and a maximum depth parameter associated with each seed URL, each maximum depth parameter indicating a maximum depth to which a user of the mobile device is permitted to follow links on a selected seed URL;
    an affiliation database comprising a list of one or more internet sites with which an operator of the walled garden server has an arrangement to derive affiliate revenue;
    the access controller further comprising a software implemented traffic tagger controlled by said operator and configured to tag a request for access to said one or more internet sites as coming from the mobile device, thereby enabling a sponsor site to track revenues derived through use of a said free access link by the mobile device; and
    wherein the URL seed database, the URL denied database, the specific URL database, the specific depth database and the affiliation database each comprise a computer readable storage medium or media.

2. The apparatus of claim 1 wherein the traffic tagger is configured to store a cookie on the mobile device based upon interfacing with the affiliation database.

3. The apparatus of claim 1 wherein the traffic tagger is configured to tag a request based upon interfacing with the affiliation database.

4. The apparatus of claim 1 wherein the mobile device is identified by a unique identifier.

5. The apparatus of claim 1 wherein the selected free content servable by the walled garden server comprises a fixed list of content a user is allowed to see without having to pay.

6. The apparatus of claim 5 wherein said selected free content comprises airline flight information.

7. The apparatus of claim 1 wherein the said one or more internet sites to which access is controlled comprises one of Amazon.com or e-bay.com.

8. The apparatus of claim 7 wherein said selected free content comprises airline flight information.

9. The apparatus of claim 1 configured such that selection of a seed URL adds one or more child URL's to the URL specific database to which the mobile device is granted access.

10. The apparatus of claim 1 wherein the walled garden server is configured to serve a screen display or web page to a mobile device comprising a first section which enables a user of the mobile device to become a subscriber and to sign up for paid internet service, a second section which provides one or more links to free content servable by the wall garden server, and a third section which provides access to said one or more internet sites to which internet access is controlled.

11. In a system comprising an access point configured to communicate with a mobile device and to receive a connection request from said mobile device and further comprising a walled garden server,
    a method of controlling wireless internet access comprising:
    responding to a connection request from the mobile device by sending a response to the mobile device over the internet indicating that content from the walled garden server, including free content and non-free content, can be served to the mobile device;
    configuring the walled garden server to provide one or more free access links to the mobile device to one or more internet sites to which internet access is controlled by an operator of the walled garden server;
    controlling access to said one or more internet sites to which free access links have been provided by the walled garden server through use of:
        a URL seed database indicating which of a plurality of URL's may form the start of a browsing experience by a user of the mobile device on said one or more internet sites;
        a URL denied database comprising URL's which a mobile device may not traverse while browsing;
        a specific URL database comprising a list of specific URL's to which a mobile device has previously been granted access; and
        a specific depth database storing a plurality of seed URL's and a maximum depth parameter associated with each seed URL, each depth parameter indicating a maximum depth to which a user of the mobile device is permitted to follow links on a selected seed URL;

creating an affiliation database comprising a list of one or more internet sites with which an operator of the walled garden server has an arrangement to derive affiliate revenue; and tagging a request for access to said one or more internet sites as coming from a particular mobile device, thereby enabling a sponsor site to track revenues derived through use of a said free access link by said particular mobile device.

12. The method of claim 11 wherein the step of tagging a request for internet access comprises storing a cookie on the particular mobile device by interfacing with the affiliation database.

13. The method of claim 11 wherein said one or more internet sites comprises one of Amazon.com or e-bay.com.

14. The method of claim 11 further comprising providing a screen display or web page to a mobile device comprising a first section which enables a user of the mobile device to become a subscriber and to sign up for paid internet service, a second section which provides one or more links to free content servable by the walled garden server, and a third section which provides access to said one or more internet sites to which internet access is controlled.

15. The method of claim 14 wherein said one or more internet sites comprises one of Amazon.com or e-bay.com.

16. The apparatus of claim 15 wherein said selected free content comprises airline flight information.

17. The apparatus of claim 14 wherein said selected free content comprises airline flight information.

18. Apparatus for controlling wireless internet access comprising:
  an access point configured to communicate with a mobile device and to receive a connection request from said mobile device;
  a walled garden server;
  an access controller comprising one or more digital processors, computers, or microprocessors and configured to communicate with the access point and to communicate over the internet with the walled garden server;
  wherein the access controller is configured to respond to a connection request from the mobile device by sending a response to the mobile device indicating that the access controller can serve content from the walled garden server to the mobile device, such content comprising selected free content and selected non-free content;
  wherein, in addition to the selected free content and selected non-free content, the walled garden server is configured to provide one or more free access links to the mobile device to one or more internet sites to which internet access is controlled through use of:
    a URL seed database indicating which of a plurality of URL's may form the start of a browsing experience by a user of the mobile device on said one or more internet sites; and
    a specific depth database storing a plurality of seed URL's and a maximum depth parameter associated with each seed URL, each maximum depth parameter indicating a maximum depth to which a user of the mobile device is permitted to follow links on a selected seed URL;
  an affiliation database comprising a list of one or more internet sites with which an operator of the walled garden server has an arrangement to derive affiliate revenue; and
  said access controller further comprising a software implemented traffic tagger controlled by said operator and configured to tag a request for access to said one or more internet sites as coming from a particular mobile device, thereby enabling a sponsor site to track revenues derived through use of a said free access link by said particular mobile device; and
  wherein the URL seed database, specific depth database, and affiliation database each comprise a computer readable storage medium or media.

19. In a system comprising:
  an access point configured to communicate with a mobile device and to receive a connection request from said mobile device;
  a walled garden server; and
  an access controller configured to communicate with the access point and to communicate over the internet with the walled garden server, the access controller being configured to respond to a connection request from a mobile device by sending a response to the mobile device indicating that the access controller can serve content from the walled garden server to the mobile device;
  a method of controlling wireless internet access comprising:
    configuring the walled garden server to provide one or more access links to a mobile device to one or more internet sites to which internet access is controlled by an operator of the walled garden server;
    controlling access to said one or more internet sites through use of:
      a URL seed database indicating which of a plurality of URL's may form the start of a browsing experience on said one or more internet sites; and
      a specific depth database storing a plurality of seed URL's and a maximum depth parameter associated with each seed URL, each maximum depth parameter indicating a maximum depth to which a user of the mobile device is permitted to follow links on a selected seed URL;
    creating an affiliation database comprising a list of one or more internet sites with which the operator of the walled garden server has an arrangement to derive affiliate revenue; and
    tagging a request for access to said one or more internet sites as coming from a particular mobile device, thereby enabling a sponsor site to track revenues derived through use of a said free access link by said particular mobile device.

20. The apparatus of claim 1 wherein said walled garden server comprises one or more computers or servers and associated memory.

* * * * *